US007012802B2

(12) United States Patent  (10) Patent No.:  US 7,012,802 B2
Nakajima et al.  (45) Date of Patent:  Mar. 14, 2006

(54) ELECTRONIC APPARATUS INCLUDING OPTICAL GUIDE THAT GUIDES LIGHT FROM LIGHT-EMITTING DIODE TO OUTSIDE OF HOUSING

(75) Inventors: Yuji Nakajima, Nishitama-gun (JP); Katsuo Ozawa, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 58 days.

(21) Appl. No.: 10/878,627

(22) Filed: Jun. 29, 2004

(65) Prior Publication Data

US 2005/0018396 A1  Jan. 27, 2005

(30) Foreign Application Priority Data

Jun. 30, 2003 (JP) ............................. 2003-187030

(51) Int. Cl.
 *G06F 1/16* (2006.01)
(52) U.S. Cl. ..................................................... 361/683
(58) Field of Classification Search ................ 361/683
 See application file for complete search history.

(56) References Cited

U.S. PATENT DOCUMENTS

| 5,691,880 A | * | 11/1997 | Seto et al. .................. 361/683 |
| 5,808,861 A | | 9/1998 | Nakajima et al. |
| 6,876,546 B1 | * | 4/2005 | Tsao .......................... 361/683 |
| 2004/0228103 A1 | | 11/2004 | Hsu |

FOREIGN PATENT DOCUMENTS

| JP | 8-6670 | 1/1996 |
| JP | 3382073 | 12/2002 |
| TW | 547774 | 8/2003 |

OTHER PUBLICATIONS

Taiwanese Office Action dated May 24, 2005 for Appln. No. 93117989.

* cited by examiner

*Primary Examiner*—Lisa Lea-Edmonds
(74) *Attorney, Agent, or Firm*—Pillsbury Winthrop Shaw Pittman, LLP (57) ABSTRACT

An electronic apparatus that includes a housing, a holder provided in the housing and a light-emitting portion provided in the housing. The holder is made of a resin and supports components. The holder includes an optical guide that guides light emitted from the light-emitting portion to outside of the housing, and the optical guide is formed integral with the holder.

20 Claims, 6 Drawing Sheets

ELECTRONIC APPARATUS INCLUDING OPTICAL GUIDE THAT GUIDES LIGHT FROM LIGHT-EMITTING DIODE TO OUTSIDE OF HOUSING

CROSS-REFERENCE TO RELATED APPLICATIONS

This application is based upon and claims the benefit of priority from prior Japanese Patent Application No. 2003-187030, filed Jun. 30, 2003, the entire contents of which are incorporated herein by reference.

BACKGROUND OF THE INVENTION

1. Field of the Invention

The present invention relates to an electronic apparatus such as a portable computer that has a housing in which a light-emitting diode is housed, and more specifically to a structure designed to guide light emitted from the diode to the outside of the housing.

2. Description of the Related Art

U.S. Pat. No. 5,808,861 and Jpn. Pat. Appln. KOKAI Publication No. 8-6670 each disclose a portable computer, which is an example of the electronic apparatus. The portable computer includes a main unit and a display unit supported on the main unit.

The main unit includes an indicator that displays the operation status of the portable computer or the contents of a function. The indicator has a plurality of lenses that are exposed to the outside of the main unit. The lenses are placed to face a plurality of diodes housed inside the main body. In a portable computer of such a type that a light-emitting diode is placed distant away from a respective lens, an optical guide is provided between the diode and the lens. The optical guide is made of a transparent synthetic resin material. When a light-emitting diode emits light, the light emitted from the diode is guided through the optical guide to a respective lens. Thus, the lens that corresponds to the diode that is emitting the light is lit up to optically indicate the operation status of the portable computer or the contents of a function.

On the other hand, the main unit contains a plurality of components such as a printed wiring board on which light-emitting diodes are mounted, a speaker and a sub-battery. These components are held at predetermined positions within the main unit via one holder.

In conventional portable computers, an optical guide and a holder are separate parts from each other. With this structure, the optical guide and holder need to be mounted to the main unit, thereby requiring a more time and labor in the assembly of the main unit. In addition, a plurality of screws and boss portions are required to mount the optical guides and holder to the main unit. As a result, the number of parts is increased, and consequently, the production cost of the portable computer is raised.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The first embodiment of the present invention will now be described with reference to FIGS. 1 to 9.

Figure 1:
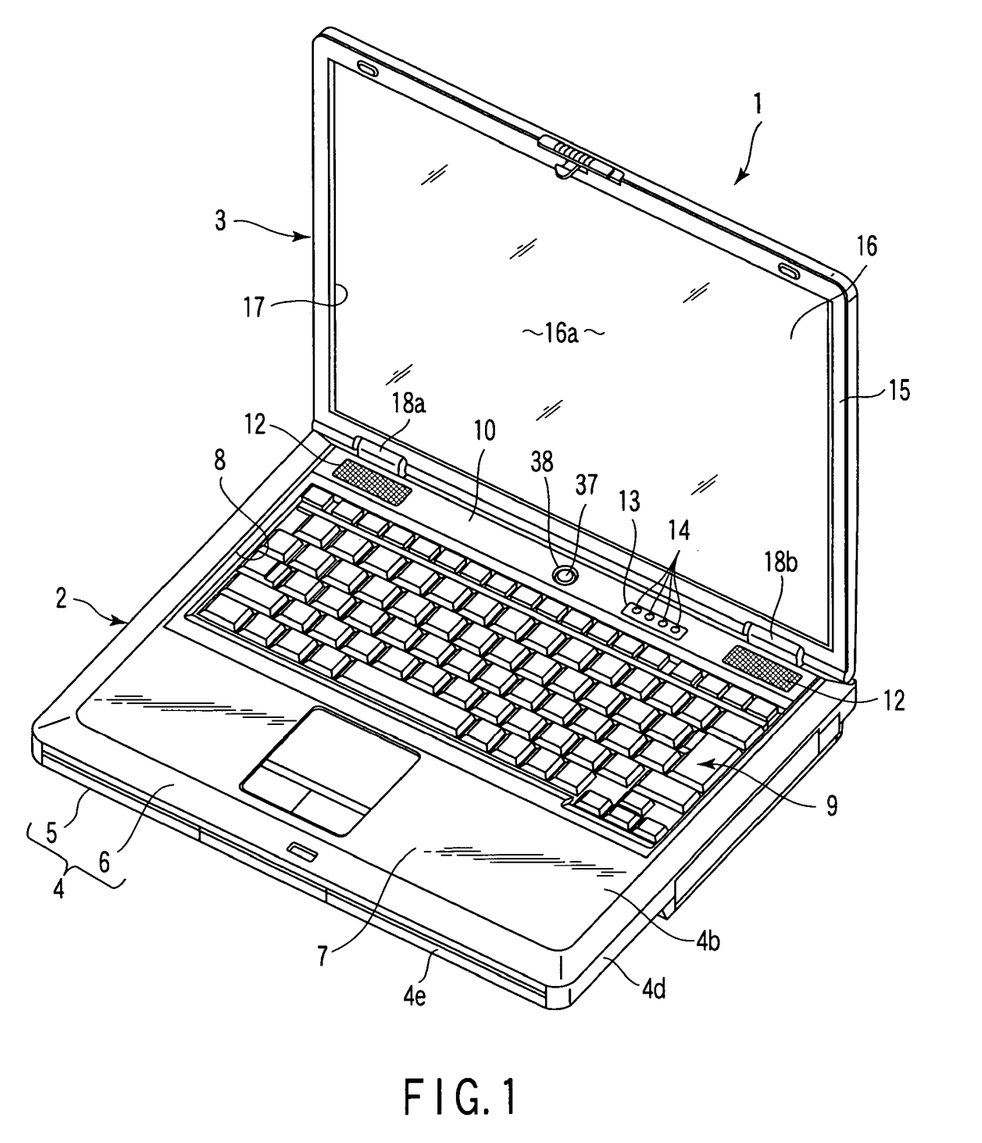
FIG. 1 is a perspective view of a portable computer according to a first embodiment of the present invention.
Figure 2:
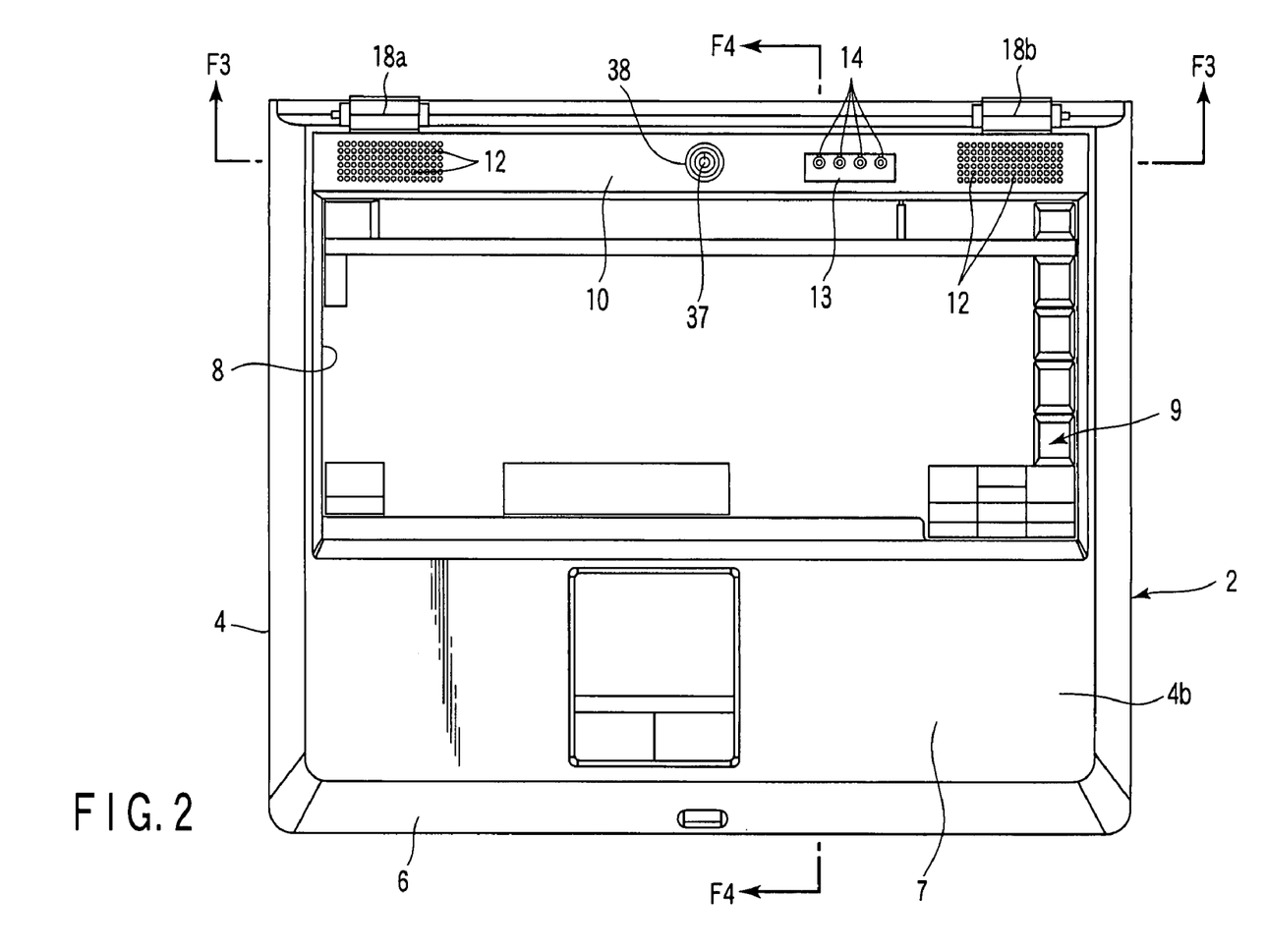
FIG. 2 is a plan view of a main unit according to the first embodiment of the present invention.

FIG. 1 discloses a portable computer 1 serving as an electronic apparatus. The portable computer 1 includes a main unit 2 and a display unit 3. The main unit 2 includes a flat box-like housing 4. As shown in FIGS. 2 to 5, the housing 4 includes a bottom wall 4a, an upper wall 4b, left and right side walls 4c and 4d, a front wall 4e and a rear wall 4f. The housing 4 includes a base 5 having the bottom wall 4a and an upper cover 6 having the upper wall 4b. The base 5 and upper cover 6 cooperate with each other to form the side walls 4c, 4d, front wall 4e and rear wall 4f.

The upper wall 4b of the housing 4 includes a palm rest 7 and a keyboard mount section 8. The palm rest 7 is located in a front half section of the upper wall 4b. The keyboard mount portion 8 is a recess made open in the upper wall 4b, and it is located on a rear section of the palm rest 7.

The keyboard mount section 8 supports a keyboard 9. The keyboard 9 is fit inside the keyboard mount section 8. A top cover 10 is detachably fit in a rear end portion of the keyboard mount section 8. The top cover 10 has a strip-like shape extending in a width direction of the housing 4. The keyboard 9 is sandwiched by its rear end portion between the top cover 10 and the keyboard mount section 8, thus fixating the keyboard 9 at a set position for the keyboard mount section 8.

Figure 3:
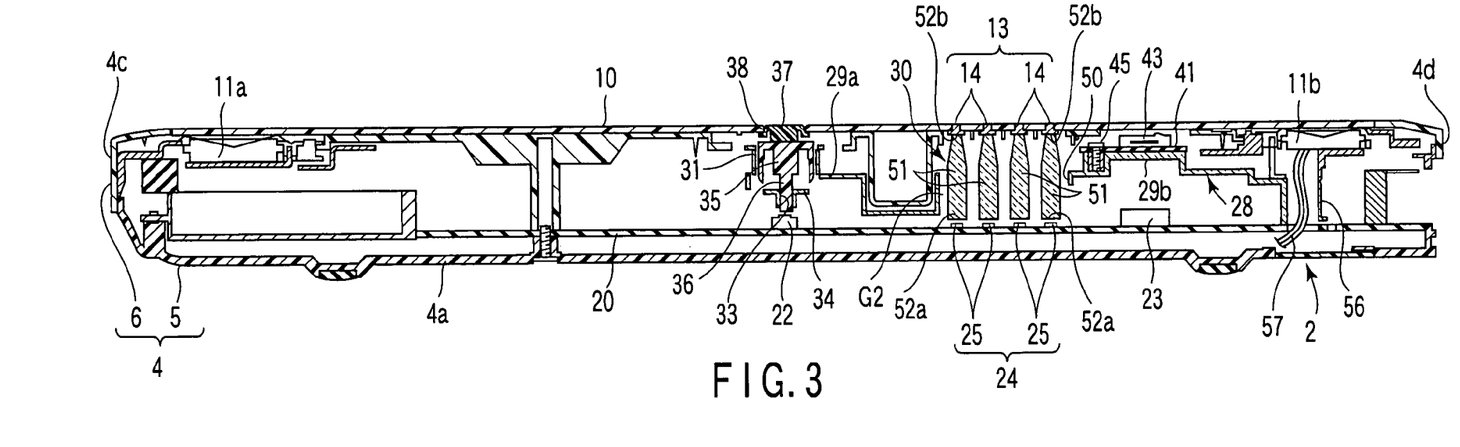
FIG. 3 is a cross sectional view taken along the line F3—F3 in FIG. 2.

As shown in FIG. 3, a pair of speaker units 11a and 11b are provided in the rear end portion of the keyboard mount section 8. The speaker units 11a and 11b are located away from each other in the width direction of the housing 4, and they are covered by the top cover 10. The top cover 10 has a number of sound-penetrating holes 12 at respective positions corresponding to the speaker units 11a and 11b. Further, the top cover 10 includes an indicator 13 that optically indicates the operation status of the portable computer 1 or the contents of the function. The indicator 13 includes four lenses 14. The lenses 14 are arranged in line with intervals in the longitudinal direction of the top cover 10, and they are exposed to outside of the main unit 2.

As shown in FIG. 1, the display unit 3 includes a display housing 15 and a liquid crystal display panel 16 housed in the display housing 15. The liquid crystal display panel 16 includes a screen 16a that displays images. The screen 16a is exposed to the outside of the display unit 3 through an opening portion 17 made in the front surface of the display housing 15.

The display housing 15 of the display unit 3 is supported on the rear end portion of the housing 4 by means of a pair of hinge portions 18a and 18b. The display unit 3 is pivotable between a close position and an open position. At the close position, the display unit 3 is set on the main unit 2 such as to cover the palm rest 7 and the keyboard 9 from an upper side. At the open position, the display unit 3 is set to stand up with respect to the main unit 2 such as to expose the palm rest 7 and the keyboard 9.

Figure 4:
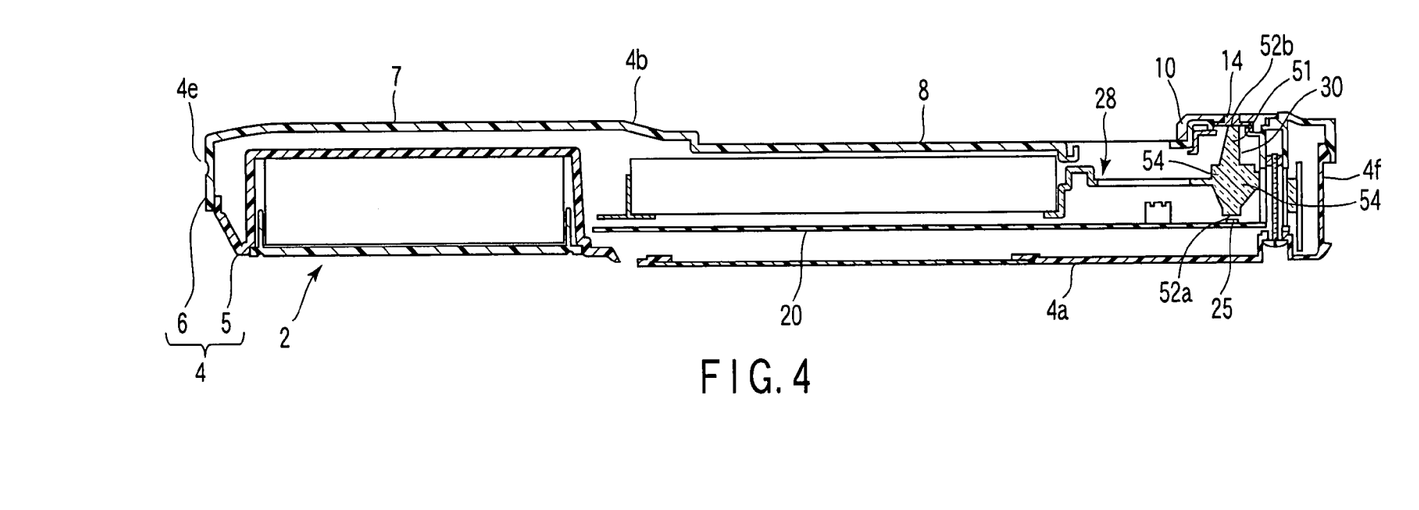
FIG. 4 is a cross sectional view taken along the line F4—F4 in FIG. 2.
Figure 5:
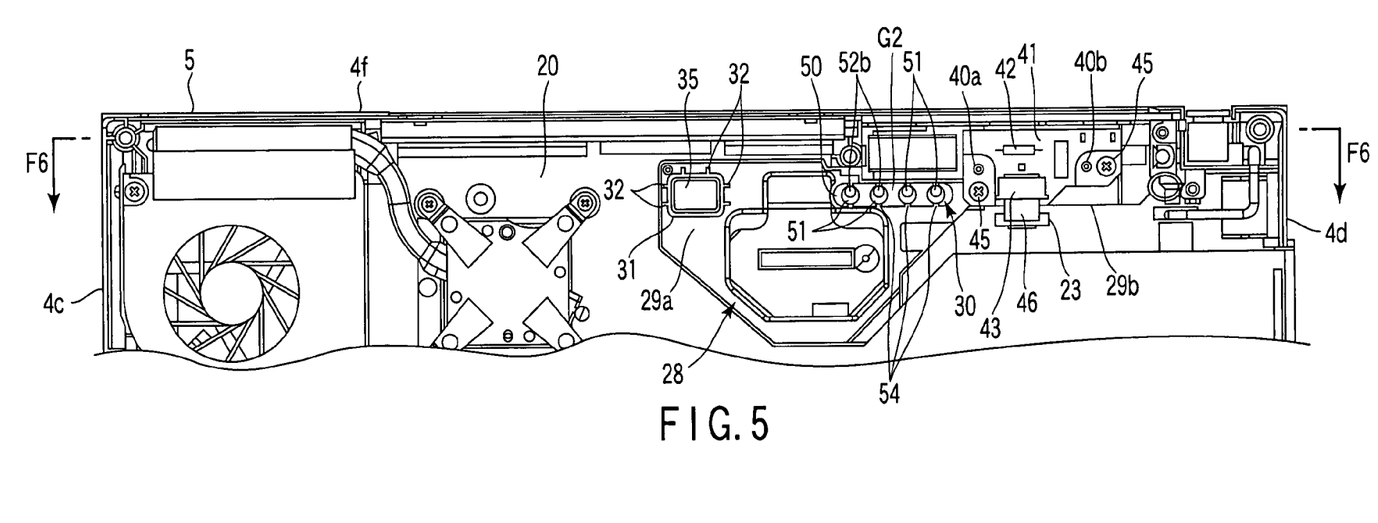
FIG. 5 is a plan view of the structure in which a holder containing an optical guide is built in a housing in the first embodiment of the present invention.
Figure 6:
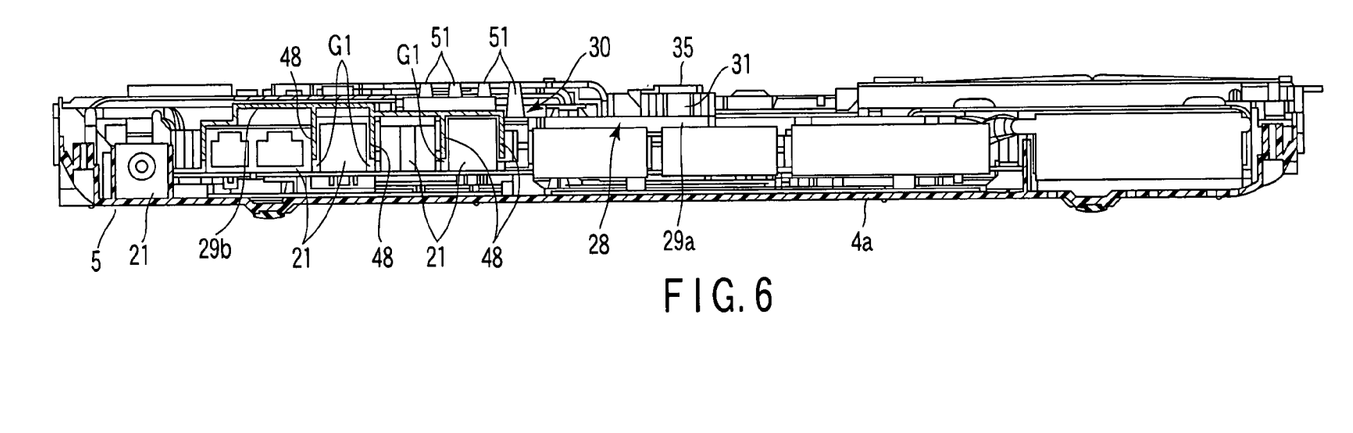
FIG. 6 is a cross sectional view taken along the line F6—F6 in FIG. 5.

As shown in FIGS. 3, 4 and 6, the housing 4 houses a first printed wiring board 20, which serves as a mother board. The first printed wiring board 20 is placed in parallel with the bottom wall 4a of the housing 4 and the most part of the wiring board 20 is located underneath the keyboard 9. A plurality of connectors 21 are mounted on the rear end portion of the upper surface of the first printed wiring board 20. The connectors 21 are designed to connect peripheral equipments including a printer, for example, to the apparatus. The connectors 21 are arranged in line with intervals therebetween in the width direction of the housing 4. A gap G1 is set between an adjacent pair of connectors 21.

As shown in FIG. 3, a power switch 22, a cable connector 23 and a light-emitting portion 24 are mounted on the upper surface of the first printed wiring board 20. The power switch 22, the first cable connector 23 and the light-emitting portion 24 are located underneath the top cover 10 and they are also arranged in the width direction of the housing 4. The light-emitting portion 24 is situated between the power switch 22 and the first cable connector 23. The light-emitting portion 24 includes four light-emitting diodes 25 as light sources. The light-emitting diodes 25 are arranged in line with intervals therebetween in the width direction of the housing 4 and they are set to face the lenses 14, respectively.

As shown in FIGS. 3 to 7, a holder 28 is housed in the rear end portion of the housing 4. The holder 28 is fixated to the upper surface of the first printed wiring board 20 with a plurality of screws such as to cover the power switch 22, the cable connector 23 and the light-emitting portion 24 from an upper side.

Figure 7:
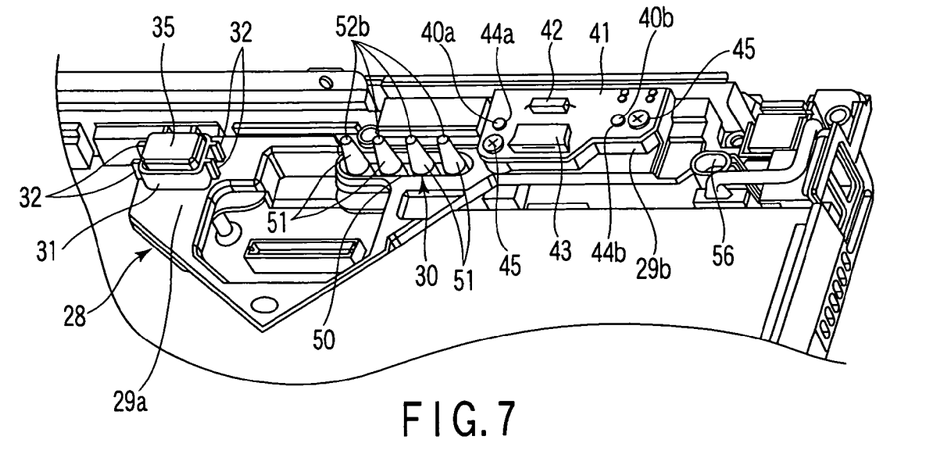
FIG. 7 is a perspective view of the structure in which the holder containing the optical guide is built in the housing in the first embodiment of the present invention.
Figure 8:
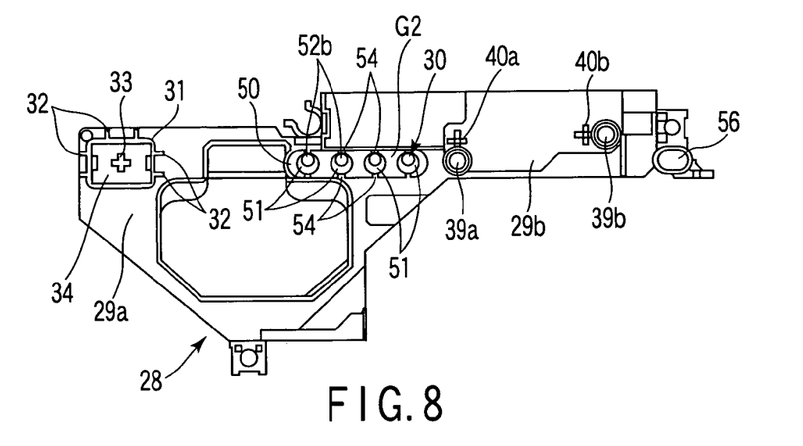
FIG. 8 is a plan view of the holder according to the first embodiment of the present invention.
Figure 9:
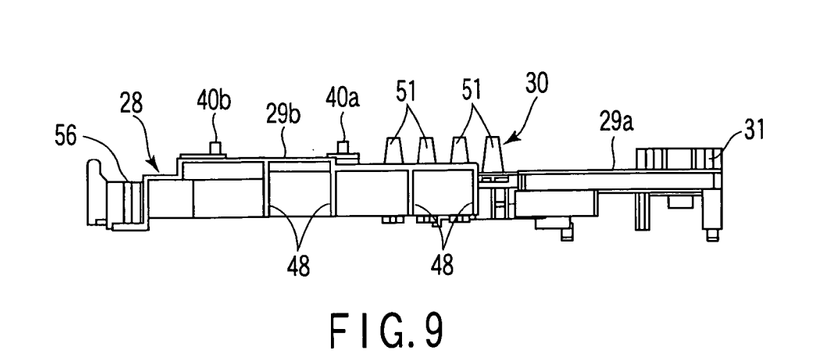
FIG. 9 is a side view of the holder according to the first embodiment of the present invention.

The holder 28 is made of a transparent synthetic resin material. The holder 28 includes first and second support portions 29a and 29b and an optical guide 30, which are formed integral with the holder. The first support portion 29a is located immediately above the power switch 22. As shown in FIGS. 7 to 9, the first support portion 29a has a guide wall 31 having a quadrilateral cross section. The guide wall 31 projects upwards from the upper surface of the first support portion 29a. A plurality of ribs 32 are formed on the outer circumference of the guide wall 31. The ribs 32 are formed as bridges between the outer circumference of the guide wall 31 and the upper surface of the first support portion 29a so as to reinforce the guide wall 31. The guide wall 31 has a bottom portion 34 in which a through hole 33 is made. The through hole 33 is located directly above the power switch 22.

A switch element 35 as a component is housed inside the guide wall 31. The switch element 35 is supported to be movable in the vertical direction by the guide wall 31. The switch element 35 has an operation shaft 36 projecting downwards. The operation shaft 36 is pierced through the through hole 33. A lower end of the operation shaft 36 is set to face the power switch 22. A power button 37 is provided on the upper surface of the switch element 35. The power button 37 is exposed outside the housing 4 through an opening portion 38 made in the top cover 10. The power button 37 is located adjacent to the indicator 13. When the power button 37 is pushed with a finger, the power switch 22 is turned ON or OFF by means of the switch element 35.

As shown in FIGS. 3 and 9, the second support portion 29b of the holder 28 is situated at a higher level than that of the first support portion 29a, and further the second support portion 29b is placed adjacent to the first cable connector 23. The second support portion 29b includes a pair of boss portions 39a and 39b, a pair of guide projections 40a and 40b. The boss portions 39a and 39b and the guide projections 40a and 40b project from the upper surface of the second support portion 29b.

A second printed wiring board 41 as another component is supported on the second support portion 29b. The second printed wiring board 41 supports an electronic part 42 and a second cable connector 43. The second printed wiring board 41 has a pair of guide holes 44a and 44b. The guide projections 40a and 40b are plugged into the guide holes 44a and 44b, respectively, so as to set the position of the second print wiring board 41 with regard to the second support portion 29b. The second printed wiring board 41 is fixed to the boss portions 39a and 39b via a pair of screws 45. The first cable connector 23 of the first printed wiring board 20 and the second cable connector 43 of the second printed wiring board 41 are electrically connected to each other via a flexible printed wiring board 46 (shown in FIG. 5).

As shown in FIGS. 6 and 9, the second support portion 29b of the holder 28 is located above the connector 21. A plurality of reinforcing portions 48 are formed integrally on the lower surface of the second support portion 29b. The reinforcing portions 48 are each formed to have a flat plate shape and they project downwards from the lower surface of the second support portion 29b. The reinforcing portions 48 are inserted respectively into gaps G1 created between adjacent connectors 21 so as to support the connectors 21 from sides.

With the above-described structure, the mounting strength of the connector 21 to the first printed wiring board 20 is increased. Therefore, when, for example, the plug of a peripheral device is inserted to the connector 21 or the plug is withdrawn from the connector 21, the connector 21 can withstand the force applied itself. Further, the reinforcing portions 48 function as ribs that reinforce the second support portion 29b, thereby preventing the deformation of the holder 28.

As shown in FIGS. 3 and 7, the holder 28 has a through hole 50. The through hole 50 is located between the lenses 14 and the light-emitting diodes 25. The through hole 50 has an elliptic shape that elongates along the arrangement direction of the light-emitting diodes 25.

The optical guide 30 of the holder 28 is located inside the through hole 50. The optical guide 30 is designed to guide light emitted from each of the diodes 25 towards the respective one of the lenses 14. The optical guide 30 includes four guide sections 51 each having a columnar shape. The guide sections 51 are situated between the light-emitting diodes 25 and the lenses 14, respectively, and they are arranged in line in the width direction of the housing 4 with intervals between adjacent pairs. Each of the guide sections 51 has a first end surface 52a and a second end surface 52b. The first end surface 52a is set to face the respective one of the light-emitting diodes 25. The second end surface 52b is set in contact with the respective one of the lenses 14. The first end surface 52a has a larger diameter than that of the second end surface 52b. In other words, each of the guide sections 51 becomes narrower gradually from the first end surface 52a towards the second end surface 52b.

As shown in FIG. 8, each of the guide sections 51 is held inside the through hole 50 via a pair of bridge portions 54. The bridge portions 54 are formed integrally with the guide sections 51 and the holder 28, and each one of the bridge portions 54 is formed as bridges between the outer circumference of the respective one of the guide sections 51 and the holder 28. Each of the bridge sections 54 defines a gap G2 between the respective one of the guide sections 51 and the holder 28. In other words, the guide sections 51 are formed to be separated from the holder 28 except for the sections of the bridge portions 54.

As shown in FIGS. 3, 7 and 8, the holder 28 includes a cylindrical cable guide 56. The cable guide 56 is integrally formed at an end portion of the second support portion 29b, and the guide 56 is set to stand in the thickness direction of the housing 4. The cable guide 56 is located near one of the speaker unit, that is, unit 11b. Speaker cables 57 drawn from the other speaker unit 11b, some other cables (not shown) are provided through the cable guide 56 from the upper section of the holder 28 to the lower section.

When light is emitted from one of the light-emitting diodes 25, the emitted light is inputted to the first end surface 52a of the respective one of the guide sections 51. The inputted light passes through the inside of the guide section 51 to reach the second end surface 52b and then it is emitted via the respective lens 14 to the outside of the main unit 2. Thus the lenses 14 that correspond to those of the light-emitting diode 25 which are emitting light are lit. In this manner, the operation state of the portable computer 1 and the contents of the function are indicated in an optical way.

According to the first embodiment of the present invention, the holder 28 includes the first and second support portions 29a and 29b that support components such as the switch element 35 and the second printed wiring board 41, and the optical guide 30 that guides the light emitted from each of the light-emitting diodes 25 to the respective one of the lenses 14. The first and second support portions 29a and 29b and the optical guide 30 are formed of a transparent synthetic resin material to be integral with each other.

With the above-described structure, it is possible to add the function of guiding light emitted from each of the light-emitting diodes 25 to the respective one of the lenses 14 to the holder 28 that supports the components. In other words, it is possible to add the function of supporting the components to the optical guide 30 that guides the light emitted from each of the light-emitting diodes 25 to the respective one of the lenses 14. Therefore, the number of the parts of the main unit 2 can be reduced.

In addition, with the structure in which the holder 28 is fixed to the housing 4, the optical guide 30 is set at a predetermined position between the light-emitting diodes 25 and the lenses 14. Therefore, it is not necessary to mount the optical guide 30 and holder 28 separately to the housing 4, and thus the number of work steps required to assemble the portable computer 1 can be reduced. Consequently, the production cost for the portable computer 1 can be cut down.

Figure 10:
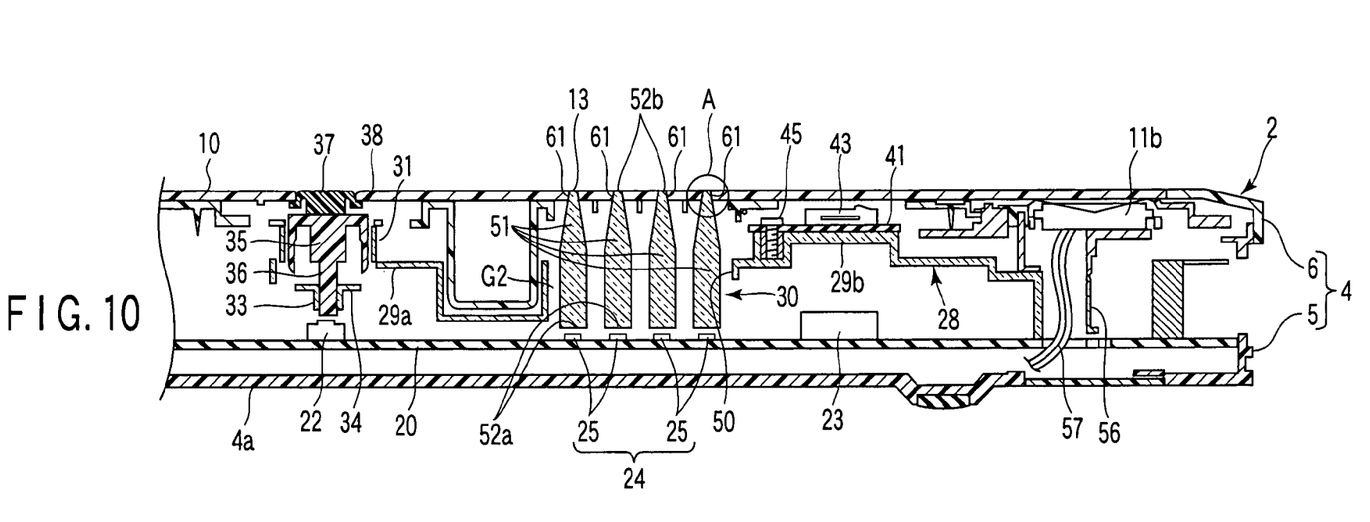
FIG. 10 is a plan view of the structure in which a holder containing an optical guide is built in a housing in a second embodiment of the present invention.
Figure 11:
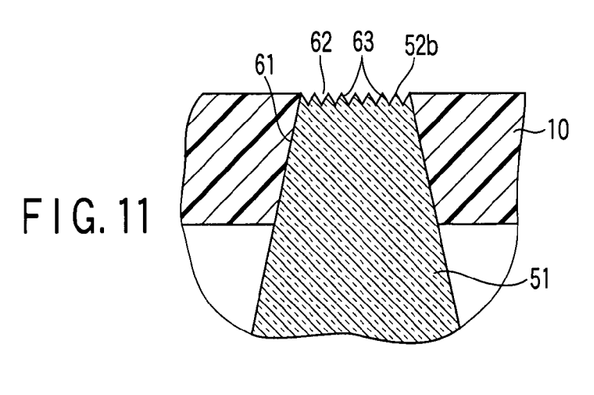
FIG. 11 is a cross sectional enlarged view of section A shown in FIG. 10.

FIGS. 10 and 11 show the second embodiment of the present invention. The second embodiment is different from the first embodiment in the respect of the structure of guiding light emitted from the light-emitting diodes 25 to the outside of the housing 4. The rest of the structure is similar to that of the first embodiment. Therefore, in the descriptions of the second embodiment provided below, the structural elements similar to those of the first embodiment will be designated by the same reference symbols, and the explanations for the elements will be omitted.

As shown in FIG. 10, the top cover 10 includes four through holes 61. The through holes 61 are situated directly above the light-emitting diodes 25. Upper end portions of the guide sections 51 of the optical guide 30, which have the second end surfaces 52b, are inserted to the through holes 61, respectively. Each of the second end surfaces 52b is exposed from the upper surface of the top cover 10, to make a light emitting surface 62 that output the light emitted from the respective light-emitting diode 25. As shown in FIG. 11, the light emitting surface 62 includes irregular recesses and projections 63. Due to the recesses and projections 63, the light emitting surface 62 is formed into a rough surface that diffuses light.

According to the second embodiment of the present invention, the light emitted from each of the light-emitting diodes 25 is guided directly to the outside of the portable computer 1 from the light emitting surface 62 of the respective one of the guide sections 51. With this structure, the structural elements corresponding to the lenses 14 of the first embodiment are not necessary in this embodiment, and thus the number of parts can be further reduced. Accordingly, it is no longer necessary to mount the lenses 14 to the top cover 10, and thus the number of work steps for assembling the portable computer can be reduced.

The electronic apparatus according to the present invention are not limited to portable computers, but the present invention can be applied to some other devices as well such as handheld devices including PDA (Personal Digital Assistants) and data projectors.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic apparatus comprising:
    a housing;
    a resin-made holder provided in the housing and configured to support a plurality of components;
    a light-emitting portion provided in the housing; and
    an optical guide formed integral with the holder and configured to guide light emitted from the light-emitting portion to outside of the housing.

2. The electronic apparatus according to claim 1, wherein the light-emitting portion includes at least one light source and the optical guide includes at least one columnar guide section corresponding to the at least one light source.

3. The electronic apparatus according to claim 2, wherein the holder includes a through hole through which the at least one guide section passes, and a plurality of bridge portions configured to hold the at least one guide section within the through hole.

4. The electronic apparatus according to claim 3, wherein the plurality of bridge portions each project from an outer circumference of the at least one guide section, and define a gap between the at least one guide section and the holder.

5. The electronic apparatus according to claim 2, wherein the at least one guide section includes a first end surface that faces the at least one light source, and a second end surface located at an opposite side to the first end surface and configured to output light emitted from the at least one light source.

6. The electronic apparatus according to claim 5, wherein the housing includes a lens exposed to outside of the housing, and the second end surface of the at least one guide section is set to face the lens.

7. The electronic apparatus according to claim 5, wherein the second end surface of the at least one guide section is exposed to the outside of the housing, and includes recesses and projections configured to diffuse light.

8. The electronic apparatus according to claim 5, wherein the first end surface of the at least one guide section is larger than the second end surface.

9. The electronic apparatus according to claim 1, wherein the housing houses a printed wiring board on which a plurality of connectors are mounted, and the holder includes a plurality of reinforcing portions configured to support the plurality of connectors.

10. The electronic apparatus according to claim 9, wherein the plurality of connectors are arranged in line with intervals between adjacent pairs of the connectors and the plurality of reinforcing portions are plugged into gaps between the adjacent pairs of the connectors.

11. The electronic apparatus according to claim 1, wherein the holder includes a plurality of support portions configured to support the components.

12. An electronic apparatus comprising:
a housing;
a light-emitting portion provided in the housing;
a resin-made optical guide provided in the housing and configured to guide light emitted from the light-emitting portion to outside of the housing; and
a holder formed integral with the optical guide and configured to support a plurality of components.

13. An electronic apparatus comprising:
a housing;
a light-emitting portion provided in the housing; and
a resin-made holder provided in the housing and including a plurality of support portions configured to support components and an optical guide configured to guide light emitted from the light-emitting portion to outside of the housing, the plurality of support portions and the optical guide being formed integral with each other.

14. The electronic apparatus according to claim 13, wherein the light-emitting portion includes a plurality of light sources and the optical guide includes a plurality of columnar guide sections corresponding to the plurality of light sources, respectively.

15. The electronic apparatus according to claim 14, wherein the holder includes a through hole through which the plurality of guide sections pass, and a plurality of bridge portions configured to hold the plurality of guide sections within the through hole, the plurality of bridge portions projecting from outer circumferences of the plurality of guide sections and defining gaps between the plurality of guide sections and the holder.

16. The electronic apparatus according to claim 14, wherein the plurality of guide sections each includes a first end surface that faces a respective one of the plurality of light sources, and a second end surface located on an opposite side to the first end surface and configured to output light emitted from a respective one of the plurality of light sources, each of the plurality of guide sections reducing its diameter from the first end surface towards the second end surface.

17. An electronic apparatus comprising:
a housing including a keyboard support section;
a keyboard provided in the keyboard support section;
a top cover configured to fix the keyboard to the keyboard support section and expose to outside of the housing;
a resin-made holder provided in the housing and configured to support a plurality of components;
a light-emitting portion provided in the housing; and
an optical guide formed integral with the holder and configured to guide light emitted from the light-emitting portion to outside of the top cover.

18. The electronic apparatus according to claim 17, wherein the top cover includes a lens exposed to the outside of the top cover and the optical guide guides light emitted from the light-emitting portion to the lens.

19. The electronic apparatus according to claim 17, wherein the optical guide includes a first end surface that faces the light-emitting portion, and a second end surface located on an opposite side to the first end surface, the second end surface outputting light emitted from the light-emitting portion and being exposed to the outside of the top cover.

20. The electronic apparatus according to claim 17, wherein the second end surface includes recesses and projections configured to diffuse light.

* * * * *